United States Patent [19]

Sasaki et al.

[11] Patent Number: 5,632,945
[45] Date of Patent: May 27, 1997

[54] METHOD FOR REFORMING A LIQUID CRYSTAL RESIN COMPOSITE

[75] Inventors: Keita Sasaki, Hiroshima; Masao Hara, Higashi Hiroshima; Takashi Tomita, Hiroshima; Masatoshi Shinomori, Hatsukaichi, all of Japan

[73] Assignee: Mazda Motor Corporation, Hiroshima-ken, Japan

[21] Appl. No.: 400,386

[22] Filed: Mar. 3, 1995

Related U.S. Application Data

[63] Continuation of Ser. No. 919,427, Jul. 27, 1992, abandoned.

[30] Foreign Application Priority Data

Jul. 26, 1991 [JP] Japan .................... 3-187914
Sep. 30, 1991 [JP] Japan .................... 3-252211

[51] Int. Cl.$^6$ .................................................. B29C 47/00
[52] U.S. Cl. ........................ 264/210.2; 264/210.8
[58] Field of Search ..................... 264/37, 108, 171.1, 264/172.13, 210.2, 210.8, 211

[56] References Cited

U.S. PATENT DOCUMENTS

| 4,250,129 | 2/1981 | Winstead ..................... 264/37 |
| 4,340,347 | 7/1982 | Robertson ..................... 264/37 |
| 4,433,118 | 2/1984 | Schwartz et al. . |
| 4,467,969 | 8/1984 | Godfrey et al. ..................... 264/37 |
| 4,728,698 | 3/1988 | Isayev et al. ..................... 264/108 |
| 4,992,514 | 2/1991 | Schultze et al. . |

FOREIGN PATENT DOCUMENTS

| 0217563 | 4/1987 | European Pat. Off. . |
| 3734645 | 12/1988 | Germany . |
| 1-207358 | 8/1989 | Japan . |
| 1-320128 | 12/1989 | Japan . |
| 3-2261 | 8/1991 | Japan . |

OTHER PUBLICATIONS

"Summary of Technology Report for Recycling FRP Waste".

*Primary Examiner*—Leo B. Tentoni
*Attorney, Agent, or Firm*—Fish & Richardson P.C.

[57] ABSTRACT

A method for remanufacturing a composite resin having high tensile strength and high rigidity into a remanufactured molded product having the same tensile strength and rigidity which includes the steps of: providing a molded product of a composite resin of thermoplastic resin and liquid crystal polymer having a crystal transition point higher than a minimum moldable temperature of the thermoplastic resin; crushing the composite resin into particles or pieces; heating the particles or pieces at a temperature higher than the transition temperature of the liquid crystal polymer to obtain a molten composite resin by using an injection forming apparatus; extruding the molten composite resin at a temperature higher than the transition temperature of the liquid crystal polymer to obtain a moldable composite material of a sheet or strand form; and forming the moldable composite material into a molded product in a given shape at a temperature lower than the transition temperature of the liquid crystal polymer.

12 Claims, 12 Drawing Sheets

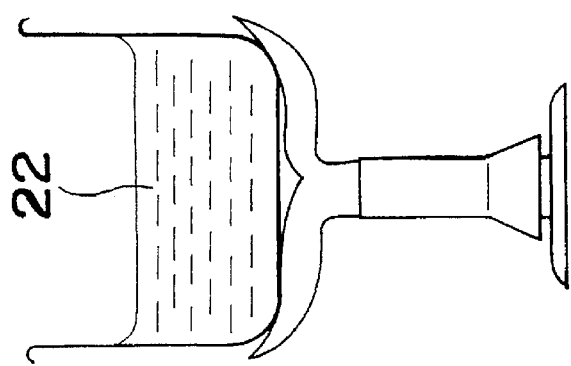
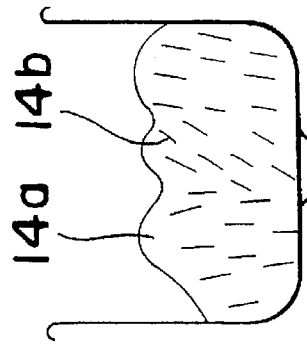 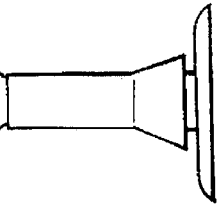
Fig.3a
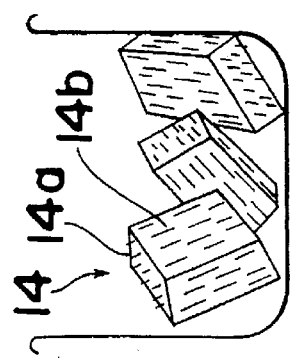 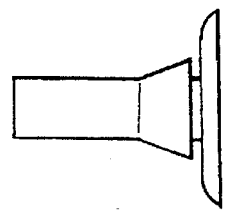
Fig.3b    Fig.3c

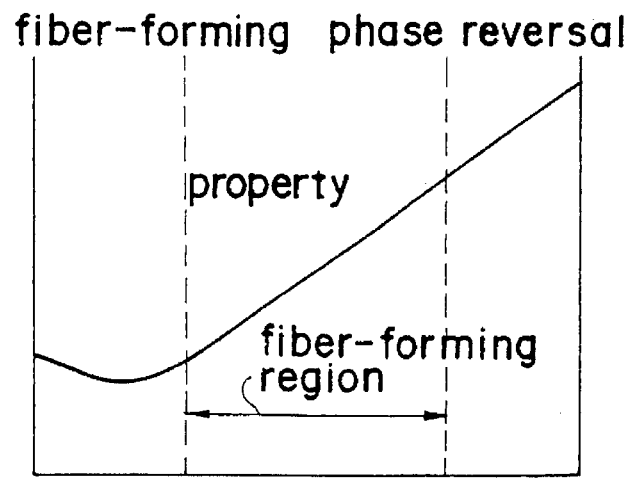
Fig. 12a
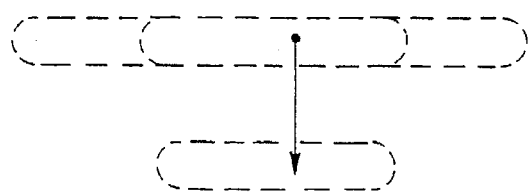
Fig. 12b
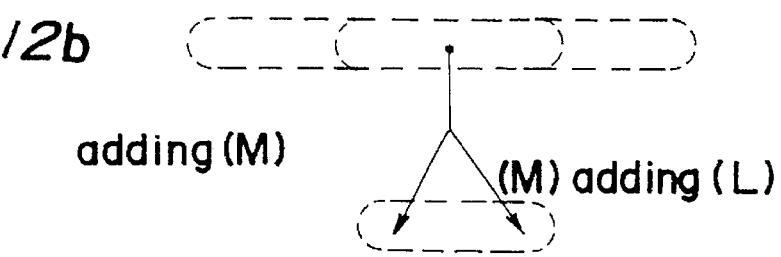
Fig. 12c
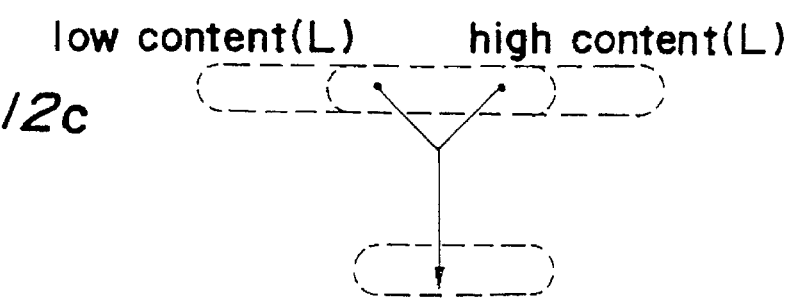
Fig. 12d
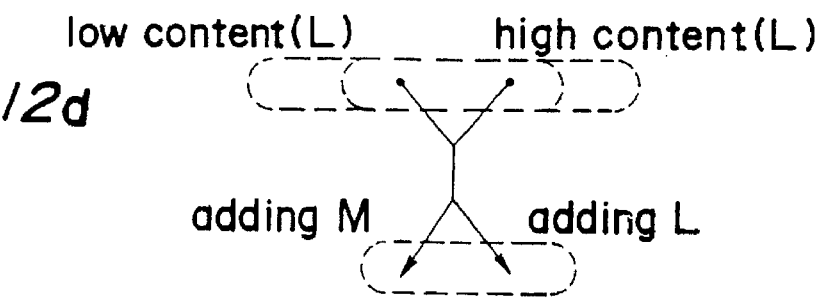

METHOD FOR REFORMING A LIQUID CRYSTAL RESIN COMPOSITE

This application is a continuation of U.S. application Ser. No. 07/919,427, filed Jul. 27, 1992, now abandoned.

BACKGROUND OF THE INVENTION

The present invention relates to a method for reforming a liquid crystal resin composite.

Conventional synthetic resins with high tensile strength and high rigidity includes a composite resin of a thermosetting resin such as SMC (sheet mold compound) and RIM mixed with glass fiber, or a thermosetting resin called stan bubble sheet mixed with a long glass fiber and molded into a given shape. Another known synthetic resin is mixed with carbon fiber instead of the above glass fiber.

Furthermore, in Japanese Patent Publication (unexamined) No. 320128/1989, a composite resin comprising a thermoplastic resin and a liquid crystal resin, has no glass fiber or carbon fiber mixed therein and has a high tensile strength and a high rigidity. This composite resin can be prepared by extruding a mixture of thermoplastic resin and liquid crystal polymer (liquid crystal resin) at a temperature higher than the phase transition temperature of the liquid crystal polymer while being drawn to obtain strand materials, cutting the strand materials into a small piece of 1 to 40 mm, and subjecting the small pieces to extrusion molding at a temperature lower than the transition temperature of the liquid crystal polymer.

In an effort to conserve resources and protect the environment, people and companies want to recycle, reuse and remanufacture plastic products. The remanufacture of plastic products, however, must be carried out by crushing the plastic product into particles, heating the crushed particles into a molten state, and forming the molten composite resin into a molding product of a given shape, or alternatively extruding the molten composite resin into a raw moldable material and later shaping it when remanufacturing synthesized resin having a high tensile strength and high rigidity, such as a fiber reinforced resin (FRP) having a reinforcing glass or carbon fiber, the reinforcing fiber is cut into small pieces as the resin is crushed. As a result, the recycled product is inferior to the original in terms of tensile strength and rigidity.

The present invention provides a superior method for remanufacturing a synthesized resin having a high tensile strength and a high rigidity into a recycled molding product having the same tensile strength and rigidity.

SUMMARY OF THE INVENTION

As a result of our study, we have found that a remanufactured liquid crystal composite has substantially the same physical properties as that of the original liquid crystal composite when remanufactured using the steps of: crushing a used product of a composite resin of thermoplastic resin as a matrix material and liquid crystal polymer as a reinforcing material, having a crystal transition temperature higher than the minimum moldable temperature of the thermoplastic resin; extruding said crushed particles or pieces at a temperature higher than the phase transition temperature to obtain a raw moldable material; and forming the moldable material into a molding product into a given shape at a temperature lower than the phase transition temperature.

Also, we have found that the same effects as the above can be obtained by remanufacturing the crushed particles or pieces directly into a molding product of a given shape at a temperature higher than the phase transition temperature of the liquid crystal polymer.

Accordingly, one aspect of the present invention is to provide a method for remanufacturing a composite resin of a liquid crystal polymer and thermoplastic resin comprising the steps of: providing a used product of a composite resin of thermoplastic resin and liquid crystal polymer having a crystal transition temperature higher than the minimum moldable temperature of the thermoplastic resin; crushing said composite resin into particles or pieces; heating said particles or pieces at a temperature higher than the phase transition temperature of said liquid crystal polymer to obtain a molten composite resin; extruding said molten composite resin at a temperature higher than the phase transition temperature to obtain raw moldable materials; and forming the moldable into a molding product in a given shape at a temperature lower than the phase transition temperature of the liquid crystal polymer.

A second aspect of the present invention is to provide a method for reforming a composite resin of liquid crystal polymer and thermoplastic resin comprising steps of: providing a used product of a composite resin of thermoplastic resin and liquid crystal polymer having a crystal transition temperature higher than a minimum moldable temperature of the thermoplastic resin; crushing said composite resin into particles or pieces; heating said particles or pieces at a temperature higher than the phase transition temperature of said liquid crystal polymer to obtain molten composite resin of the thermoplastic resin and the liquid crystal polymer; extruding said molten composite resin at a temperature higher than the phase transition temperature of the liquid crystal polymer to obtain a molding product of a given shape.

A third aspect is when a thermoplastic resin contains a liquid crystal polymer of a fiber form before crushing, it is possible to obtain a recycled molding product having the same tensile strength and rigidity as the original composite resin. This can be achieved by heating the crushed particles or pieces of the used composite resin at a temperature higher than the phase transition temperature of the liquid crystal polymer and forming the heated composite resin into a molding product of a given shape. Therefore, the present invention also provides a method for remanufacturing a used composite resin of thermoplastic resin and liquid crystal polymer having a crystal transition point (temperature) higher than the minimum moldable temperature of the thermoplastic resin, wherein the liquid crystal polymer can be of a fiber form present in the thermoplastic resin.

A fourth aspect ensures the orientation of the liquid crystal polymer in an extrusion direction. The present invention provides a method for remanufacturing a composite resin of thermoplastic resin and liquid crystal polymer having a crystal transition point higher than a minimum moldable temperature of the thermoplastic resin, wherein the step of obtaining a raw moldable composite material by extruding the molten composite resin at a temperature higher than the phase transition temperature of the liquid crystal polymer is directed to a step of obtaining a raw molding material by extruding the molten composite resin at a temperature higher than the phase transition temperature of the liquid crystal polymer while being drawn.

A fifth aspect ensures the orientation or the liquid crystal polymer is in an extrusion direction. The present invention provide a method for remanufacturing a composite resin of thermoplastic resin and liquid crystal polymer having a crystal transition point higher than the minimum moldable temperature of the thermoplastic resin, wherein the step of forming the molten composite resin into a molding product at a temperature higher than the phase transition temperature of the liquid crystal polymer is directed to a step of extrusion-forming the molten composite resin into a molding product of a given shape at a temperature higher than the phase transition temperature of the liquid crystal polymer under being extended.

A sixth aspect obtains a moldable composite material of a strand form. The present invention provides a method for remanufacturing a composite resin of thermoplastic resin and liquid crystal polymer having a crystal transition point higher than a minimum moldable temperature of the thermoplastic resin, wherein the step of obtaining a raw moldable material by extruding the molten composite resin at a temperature higher than the phase transition temperature of the liquid crystal polymer or the step of obtaining a raw moldable material by extruding the molten composite resin at a temperature higher than the phase transition temperature of the liquid crystal polymer while being drawn is directed to a step of forming the raw molding material of a strand form.

A seventh aspect obtains a raw moldable material of a sheet form. The present invention provides a method for remanufacturing a composite resin of thermoplastic resin and liquid crystal polymer having a crystal transition point higher than the minimum moldable temperature of the thermoplastic resin, wherein the step of obtaining the moldable composite material by extruding the molten composite resin at a temperature higher than the phase transition temperature of the liquid crystal polymer or the step of obtaining a raw molding material by extruding the molten composite resin at a temperature higher than the phase transition temperature of the liquid crystal polymer under being extended is directed to a step of forming the moldable composite material of a sheet form.

In accordance with the first aspect of the present invention, the first step is to crush a molding product made from a composite resin of a thermoplastic resin and a liquid crystal polymer having a crystal transition temperature higher than that of the thermoplastic resin. When the crushed particles or pieces are heated at a temperature higher than the phase transition temperature of the liquid crystal polymer, the thermoplastic resin and the liquid crystal polymer change from a solid state into a molten state.

Next, the molten composite resin is extruded at a temperature higher than the phase transition temperature of the liquid crystal polymer to obtain a raw moldable composite material. In the present invention, although the crushing process also crushes the liquid crystal polymer into small particles or pieces, the melting process causes the crushed particles to recombined. Therefore, the liquid crystal polymer in the combined prticles or pieces is solidified in a manner to have an orientation structure wherein molecules are oriented in one direction. Accordingly, the raw moldable composite material thus obtained results in an tensile strength and a rigidity equal to that of the original composite resin.

Next, the raw moldable composite material is formed into a molding product of a given shape at a temperature lower than the phase transition temperature of the liquid crystal. Therefore, the remanufactured molding product retains the molecular orientation structure of the original liquid crystal.

In accordance with the second aspect of the present invention, the first step is to crush a used product made from a composite resin of a thermoplastic resin and a liquid crystal polymer having a crystal transition temperature higher than the minimum moldable temperature of the thermoplastic resin. When the crushed particles or pieces are heated at a temperature higher than the phase transition temperature of the liquid crystal polymer, the thermoplastic resin and the liquid crystal polymer change from a solid state to a molten state.

Next, the molten composite resin is extruded at a temperature higher than the phase transition temperature of the liquid crystal polymer to obtain a raw moldable composite material. Although the crushing process also crushes the liquid crystal polymer into small sizes in a similar way to the above method, the melting process causes the crushed particles or pieces to be recombined with each other. The liquid crystal polymer in the combined crushed particles or pieces is solidified so that the molecular orientation structure is in one direction. Accordingly, the raw moldable composite material thus obtained results in an tensile strength and a rigidity equal to those of the original composite resin.

In accordance with the third aspect of the present invention, the liquid crystal polymer of a fiber form included in the composite resin is cut into crushed particles or pieces of a small size. However, the melting process causes the the crushed particles or pieces to recombine with each other, so that the liquid crystal polymer in the combined particles or pieces is solidified in an orientation structure. Accordingly, the raw moldable material thus obtained includes a liquid crystal polymer of a fiber form having a same length as that of the original liquid crystal polymer and resuts in an tensile strength and a rigidity the same as those of the original composite resin.

In accordance with the constitution of the fourth aspect of the present invention, the composite resin is extruded at a temperature higher than the phase transition temperature of the liquid crystal while being drawn to obtain a raw moldable material. Hence, the liquid crystal polymer in the raw moldable material is oriented sufficiently in the extrusion direction.

In accordance the fifth aspect of the present invention, the composite resin is extruded at a temperature higher than the phase transition temperature of the liquid crystal to obtain a molding product of a given shape. Hence, the liquid crystal polymer in the raw moldable product is oriented sufficiently in the to an extrusion direction.

In accordance with the sixth aspect of the present invention, it is possible to obtain a raw moldable material of a strand form. Therefore, it is easy to carry out an injecting formation by cutting the raw moldable material into a pellet form.

In accordance with the seventh aspect of the present invention, it is possible to obtain a raw moldable material of a sheet form which makes it easy to carry out a pressing.

Meanwhile, the used product to be remanufactured may contain various contents of liquid crystal polymer. Therefore, when two or more kinds of the used product are provided in order to remanufacture a product containing a desired content of the liquid crystal polymer, a new thermoplastic resin (compatible with the matrix thermoplastic resin) a new liquid crystal polymer, or both can be added. That is, in the case of FIG. 12(a) when molding is carried out only by use of the recycled products, a remanufactured product can have almost the same properties as that of the original product.

Further, as shown in FIG. 12(b), when an amount of the liquid crystal polymer (L) is added, an improved property results in the remanufactured product when compared with the original product. On the other hand, when an amount of the matrix thermoplastic resin is added, the manufactured product has decreased properties compared to the original product.

Furthermore, in the case of FIG. 12(c), an intermediate property between that of a high content product and that of a low content product can be obtained in the remanufactured product by using a mixture of crushed powders having a low content of the liquid crystal polymer (L) and having a high content of L. Furthermore, an additional new thermoplastic resin and/or new liquid crystal resin can be added to the above mixture to obtain a desired composition ratio of the thermoplastic resin (M) and the liquid crystal resin (L) as shown in FIG. 12(d). According to the eighth aspect of the present invention, it is a method for remanufacturing a composite resin according to claim 1, wherein in the step of heating the crushed particles or pieces into a molten composite material, the crushed particles or pieces comprises a mixture of recycled composite resins having different contents of the liquid crystal resin or a mixture of a used composite resin and a liquid crystal resin and/or a thermoplastic resin.

BRIEF DESCRIPTION OF THE DRAWINGS

These and other features of the present invention will become clear from the following description taken in conjunction with the working examples, and with reference to the accompanying drawings.

FIGS. 3(a)–3(c) are schematic view illustrating changes of the thermoplastic resin and liquid crystal polymer contained in the composite resin which is subjected to the remanufacturing process shown in FIG. 1;

FIG. 12 is a graph showing the relationship betweem mixing examples and the resulting property variations.

EMBODIMENT

Figure 1:
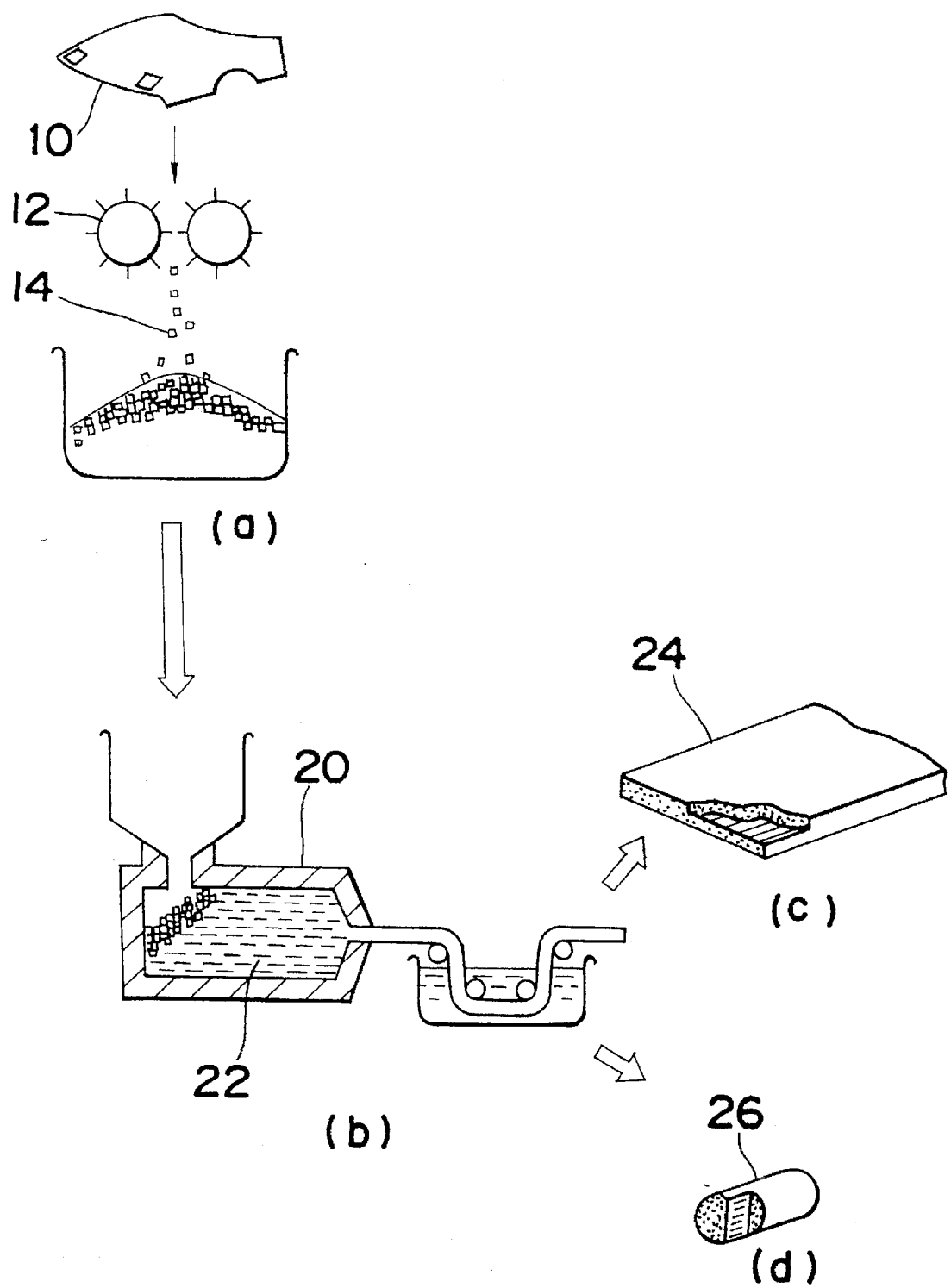
FIG. 1 is schematic view illustrating the working steps of remanufacturing a composite resin in accordance with the embodiment of the present invention.
Figure 2:
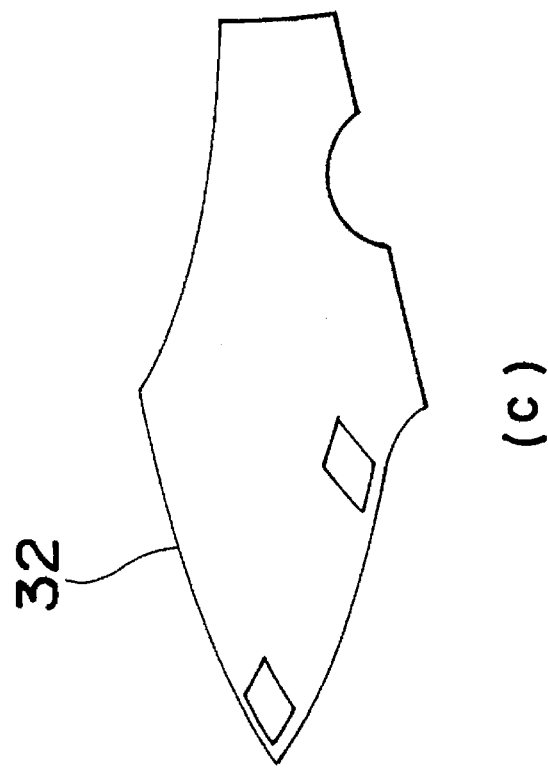
FIG. 2 is schematic view illustrating the working steps of remanufacturing the composite resin shown in FIG. 1.
Figure 2:
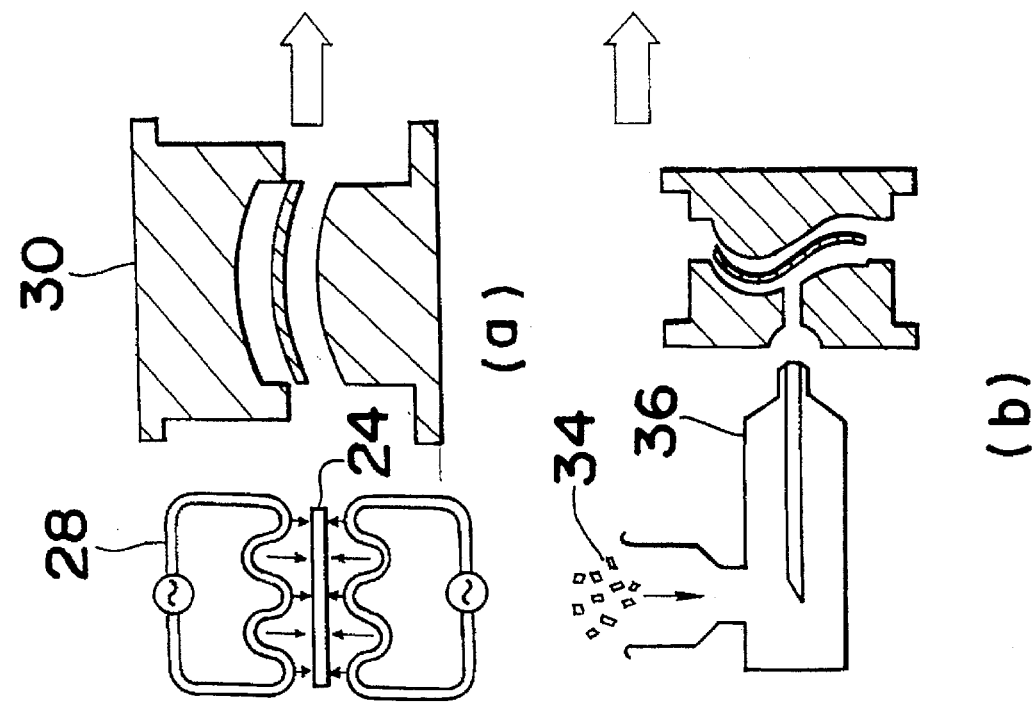

The following description will be directed to the embodiment of the present invention with reference to FIGS. 1(a)–3(c).

As shown in FIG. 1a, a first step is to provide a molding product such as an automobile hood made of composite resin 10 comprising a thermoplastic resin and a liquid crystal polymer having a melting point higher than that of the thermoplastic resin. The composite resin 10 is crushed by a crusher 12 into particles or pieces 14.

Next, the crushed particles or pieces 14 are supplied to a molten resin extrusion apparatus 20 and are heated in the molten resin extrusion apparatus 20 at a temperature higher than the phase transition temperature of the liquid crystal into a molten resin 22 comprising a thermoplastic resin and a liquid crystal polymer. The molten resin 22 is extruded at a temperature higher than the phase transition temperature of the liquid crystal while being drawn and formed into a molding material 26 of a sheet form as shown in FIG. 1c or of a strand form as shown in FIG. 1d.

Next, the molding material 24 of a sheet form is heated at a temperature lower than the phase transition temperature of the liquid crystal in a preheating apparatus 28 as shown in FIG. 2a and then is pressed into a given shape by a pressing apparatus 30 to obtain reformed molding product 32 such as an automobile hood as shown in FIG. 2c. In this case depending on the shape of the reformed molding product 32, it is possible to cut the molding material 26 of a strand form into small pieces 34, to supply the crushed particles or pieces 34 to an injection forming apparatus 36 and to form into a reformed molding product 32 by an injection method under being heated.

In the above embodiment, the remanufactured molding product is prepared by using only the crushed particles or pieces 14. However, it is possible to use the crushed particles or pieces 14 having new thermoplastic resin and new liquid crystal polymer added thereto.

FIGS. 3(a)–3(c) are schematic view illustrating the reforming process in which the thermoplastic resin and the liquid crystal polymer change in the state with the working steps.

FIG. 3a shows a state of the crushed particles or pieces 14 in advance to the heating. Reference numerals 14a and 14b indicate the thermoplastic resin and the liquid crystal polymer of a solid state, respectively, as constituents of the crushed particles or pieces 14. FIG. 3c shows a state of a molten composite resin 22 which is obtained by heating the crushed particles or pieces 14 at a temperature higher than the phase transition temperature of the liquid crystal polymer 14a. The thermoplastic resin 14a and the liquid crystal polymer 14b as constituents of the crushed particles or pieces 14 are of a molten state (liquid state). FIG. 3b shows a state of the crushed particles or pieces 14 heated at a temperature lower than the phase transition temperature of the liquid crystal polymer or a state of the crushed particles or pieces 14 cooled the molten composite resin 22 to a temperature lower than the phase transition temperature of the liquid crystal polymer 14b. The thermoplastic resin 14a is of a liquid state (molten state) but the liquid crystal polymer 14b is in a solid state. Accordingly, it is necessary to remanufacture the crushed particles or pieces 14 of a state shown in FIG. 3b into a reformed molding product of a given shape by a pressing apparatus or an injection forming apparatus.

The following description will be directed to a tensile strength and a flowing ability of the reformed molding product obtained by using PC/ABS as a thermoplastic resin.

A liquid crystal polymer as a starting material comprises VECTRA A950 (polyesther of aromatic group, the liquid crystal transition temperature is about 280° C.) made by POLYPLASTIC CO., LTD. and a thermoplastic resin as a starting material comprises TECHNIACE-T105 made by SUMITOMO DOW LTD. A composite resin is prepared by mixing the two materials mentioned above in a given mixing ratio.

Next, the composite resin is subjected to a first extrusion formation. The extrusion formation is carried out in the following conditions: an extruding apparatus is a twin screw extruder (screw diameter of 36 mm) made by RESEACH LABORATORY OF PLASTIC TECHNOLOGY; a resin temperature is 290° C.; a screw rotation is 100 rpm; die diameter is 2 mm; shear rate is 1700 sec$^{-1}$ and a tensile ratio is 2 times. The composite resin is extruded into a first molding material of a strand form in a diameter of 1.4 mm. The first molding material is cut into a first pellet material of a 3 mm length.

Next, the first pellet material is formed into a composite resin by an injection method. The injecting formation is carried out in the following conditions: The used injecting formation apparatus 220 Toh made by TOSHIBA MACHINE CO., LTD.; a die is of a test piece type; the resin temperature is 250° C. The flowing ability is tested by using the injecting formation apparatus mentioned above and a die of a spiral flow type (diameter of 6 mm of a half circle form) at the resin temperature of 250° C. at an injecting pressure of 1000 Kg/cm$^2$.

The injected composite resin is crushed into pellets having a length of 3 to 4 mm by using a crusher V-360 made by HORAI IRON WORKS CO., LTD.. The pellets are extruded into remanufactured molding material of a strand form of 1.4 mm diameter. The remanufacturing molding material of a strand form is cut into recycle used pellets of a length of 3 mm. The injection working condition is the same as that of the first extrusion formation.

The first raw moldable material of a strand form and the recycle used pellets are subjected to a tensile test. The test is carried out by using a universal testing machine (AUTOGRAPh) made by SHIMADZU Co. at a tensile rate of 20 mm/min.

Figure 4:
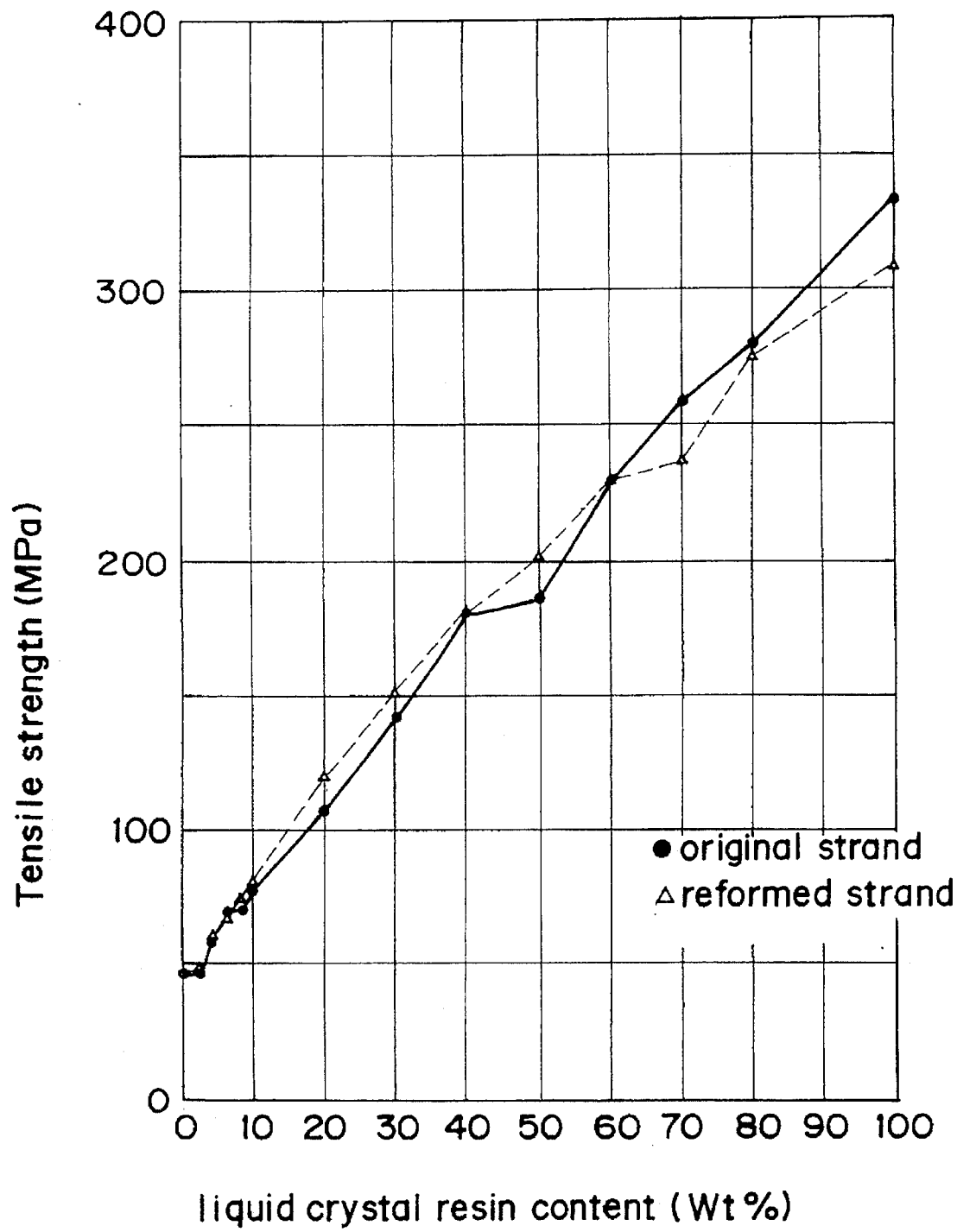
FIG. 4 is a graph showing the relationship between an amount of the liquid crystal polymer and the tensile strength of a molding product obtained by using PC/ABS as a thermoplastic resin in the remanufacturing process shown in FIG. 1.
Figure 5:
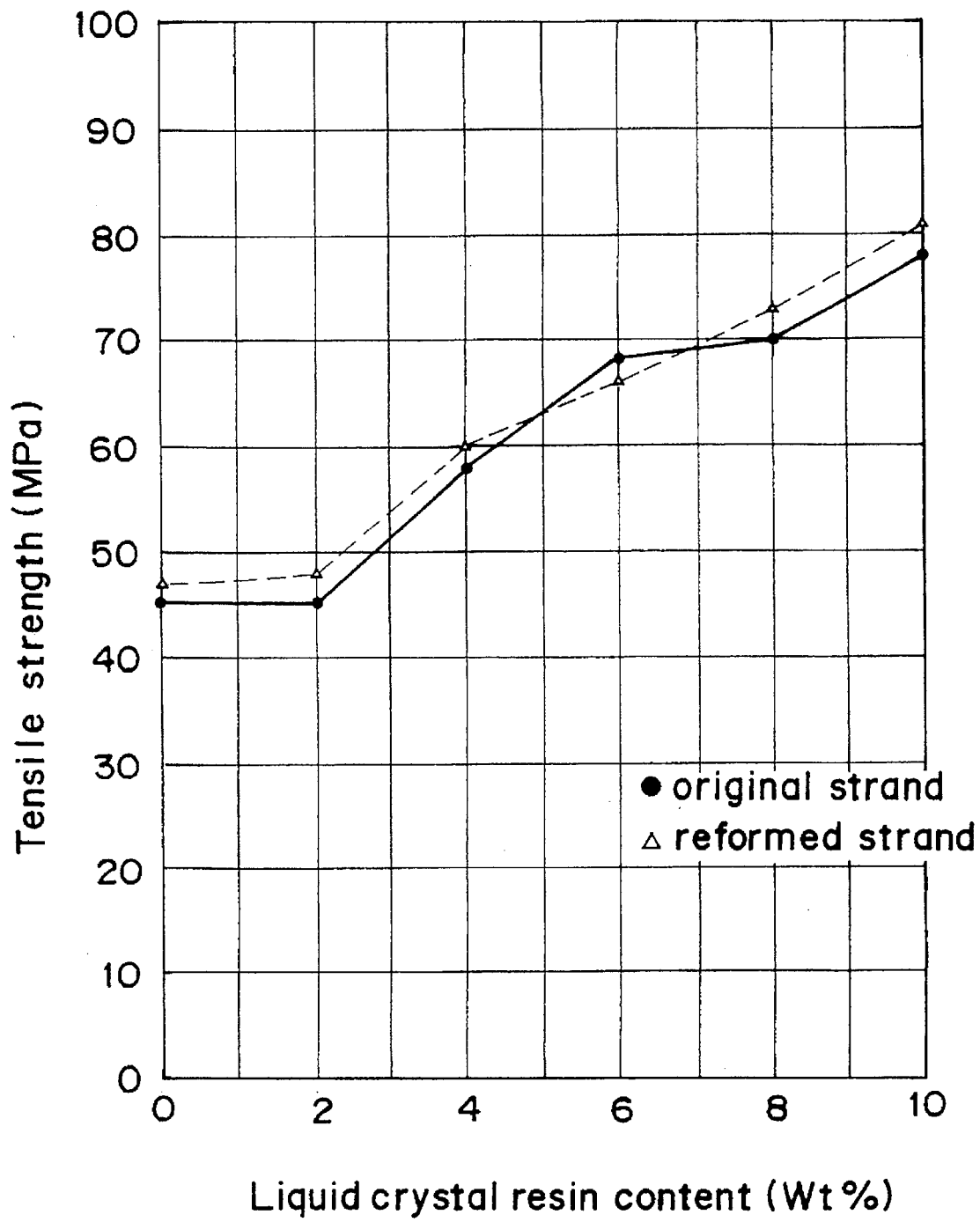
FIG. 5 is a graph showing the relationship between an amount of the liquid crystal polymer and the tensile strength of a molding product obtained by using PC/ABS as a thermoplastic resin in the remanufacturing process shown in FIG. 1.

FIGS. 4 and 5 are graphs showing the relation between tensile strength and the content of the liquid crystal polymer contained in the first molding material and recycle used moldable material, respectively. The liquid crystal polymer starts to be formed into a fiber form at a range higher than 2 to 4% of the liquid crystal amount. It is found that the original moldable material and recycled molding material show the same tensile strength at all ranges of liquid crystal polymer content. This indicates clearly that the recycled moldable material is not inferior in the tensile strength of the reformed moldable product as compared to the original molding material.

Figure 6:
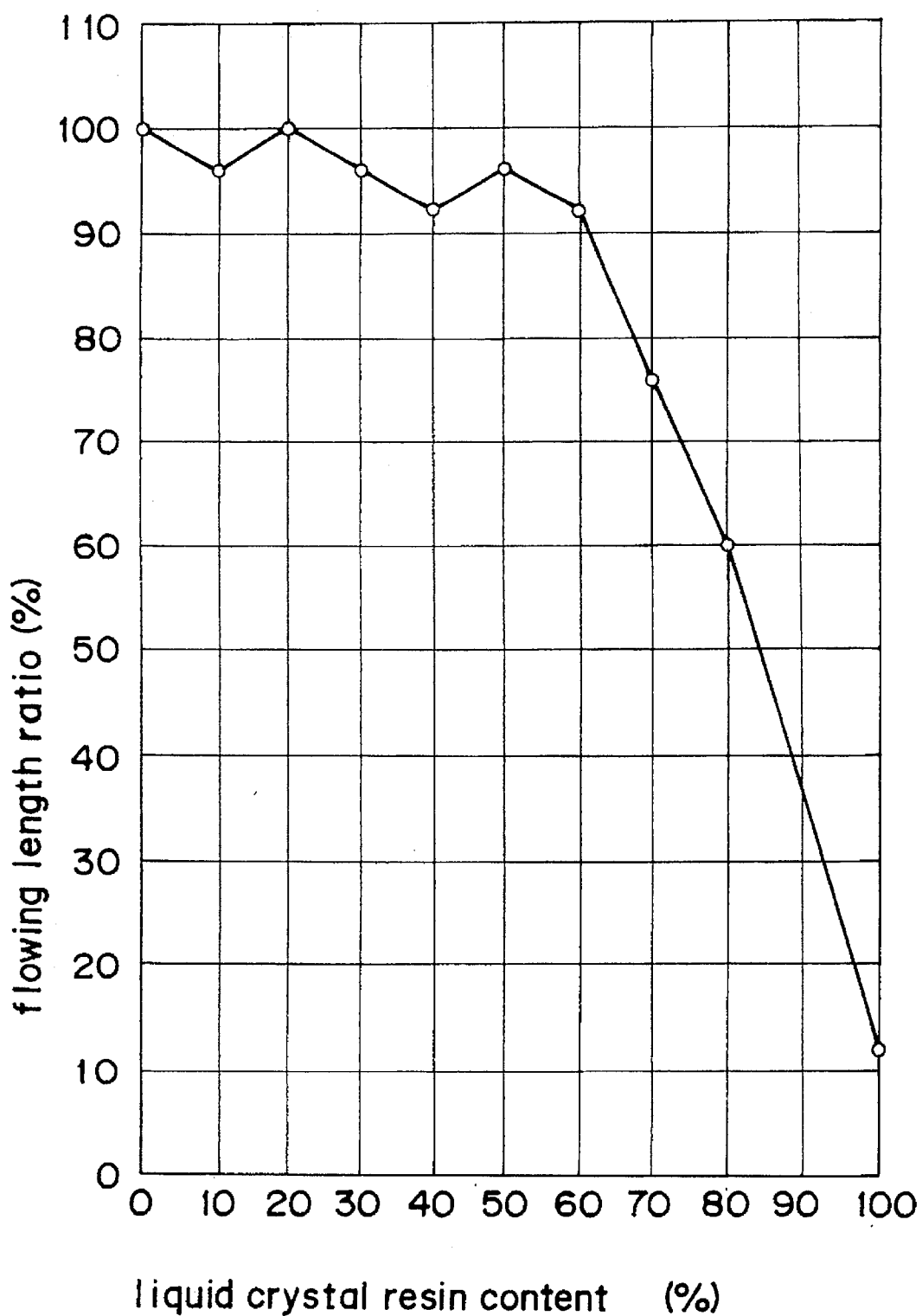
FIG. 6 is a graph showing the relationship between an amount of the liquid crystal polymer and the flowing length ratio of a molding product obtained by using PC/ABS as a thermoplastic resin in the remanufacturing process shown in FIG. 1.

FIG. 6 is a graph showing the relation between a flow length ratio and the content amount of liquid crystal polymer. It is clear from FIG. 6 that a flowing ability is greatly decreased at a liquid crystal polymer content higher than 60%. It is difficult to remanufacture a molding product by using molding material having a content of liquid crystal polymer higher than 60%. In connection with a case using PC/ABS as a thermoplastic resin, the content of liquid crystal polymer preferably ranges from 2 to 60%.

An electron microscopic observation (SEM) indicates that a large part of the liquid crystal polymer is of a powder form and a small part is of a fiber form at a liquid crystal content of 2%. On the other hand, the liquid crystal polymer content ranging from 4 to 8% results in a liquid crystal polymer of a fiber form. It is understood from the observation that a liquid crystal polymer content ranging from 2 to 4% results in a liquid crystal polymer of a fiber form and accordingly, increases the tensile strength of the resultant product.

The following description will be directed to a tensile strength and a flowing ability of a remanufactured molding product obtained by using PC/PBT as a thermoplastic resin.

A liquid crystal polymer as a starting material comprises VECTRA A950 (polyesther of aromatic group, the liquid crystal transition temperature is about 280° C.) made by POLYPLASTIC CO. LTD. and a thermoplastic resin PC/PBT as a starting material comprises XENOY 1101 made by GE PLASTIC JAPAN LTD. A composite resin is prepared by mixing the two reagents mentioned above in a given mixing ratio.

Next, the composite resin is subjected to a first extrusion formation in a condition the same as that of the PC/ABS and is formed into a first moldable material of a strand form. The first moldable material is cut into pellets of a length 3 mm into a first pellets. In this case, the flowing test is carried out in a way similar to that of the PC/ABS case.

The first pellets are injection molded in a way similar to that of PC/ABS to obtain a composite resin. A part of the composite resin is formed into a recycled moldable material of a strand form as a testing piece in a way similar to that of PC/ABS case.

Next, a tensile strength test is carried out with the original moldable material and the recycled moldable material in a way similar to that of PC/ABS case.

Figure 7:
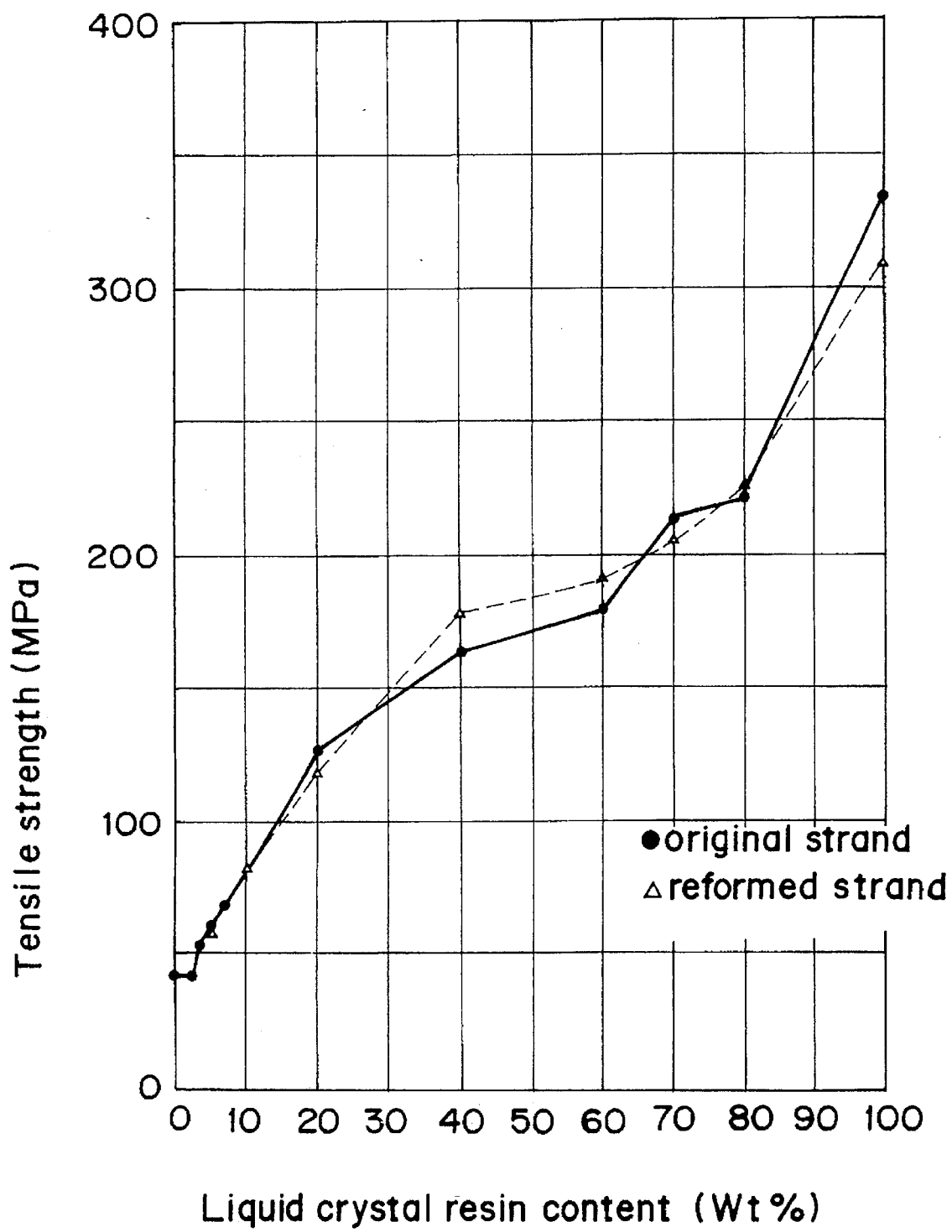
FIG. 7 is a graph showing the relationship between an amount of the liquid crystal polymer and the tensile strength of a molding product obtained by using PC/PBT as a thermoplastic resin in the remanufacturing process shown in FIG. 1.
Figure 8:
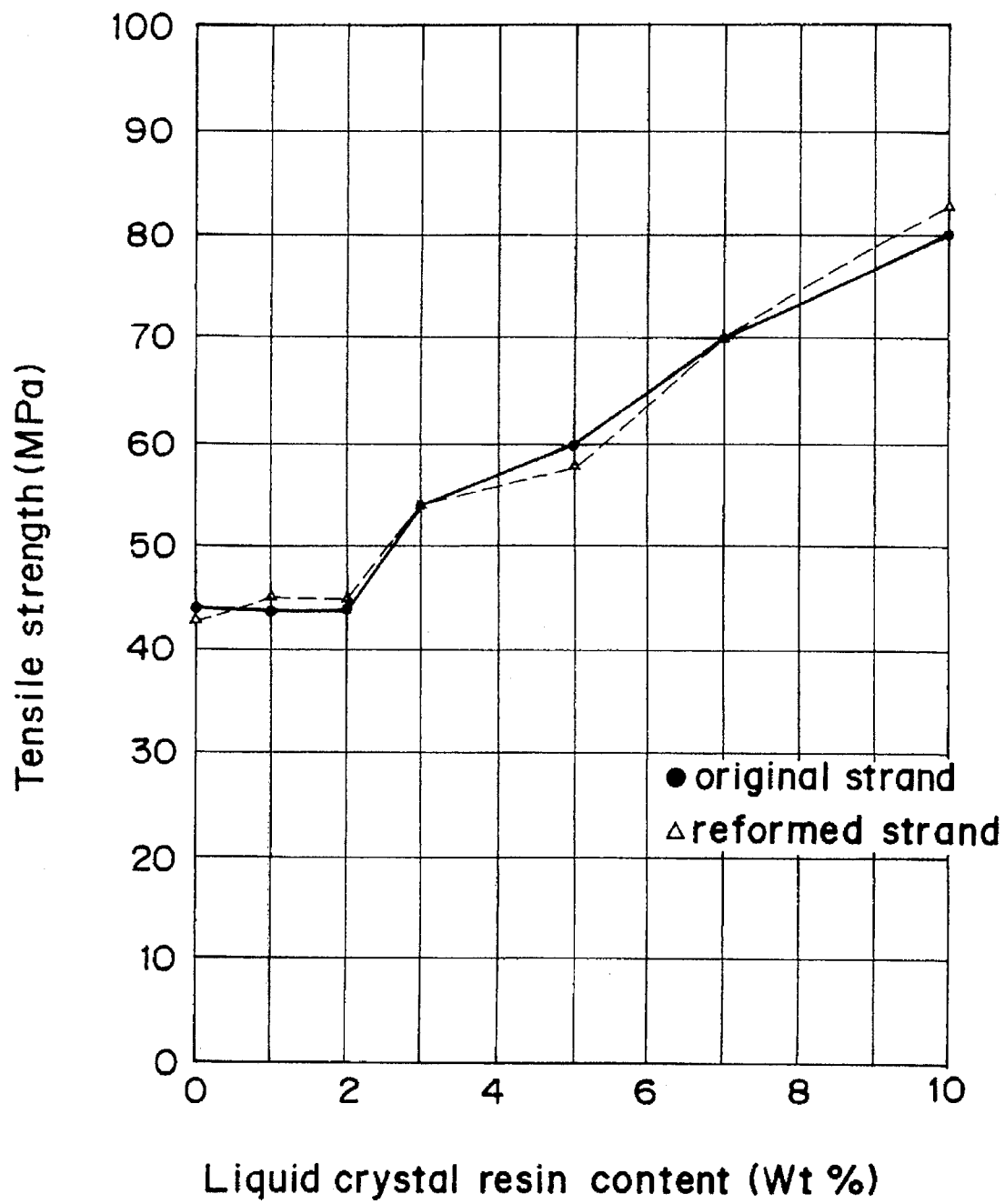
FIG. 8 is a graph showing the relationship between an amount of the liquid crystal polymer and the tensile strength of a molding product obtained by using PC/PBT as a thermoplastic resin in the remanufacturing process shown in FIG. 1.

FIGS. 7 and 8 are graphs showing the relationship between tensile strength and the content of the liquid crystal polymer contained in the original moldable material and recycled moldable material, respectively. The liquid crystal polymer starts to be formed into a fiber form at a range higher than 2 to 4% of the liquid crystal amount. It is found that the original moldable material and recycled moldable material show the same tensile strength at all ranges of liquid crystal polymer content.

Figure 9:
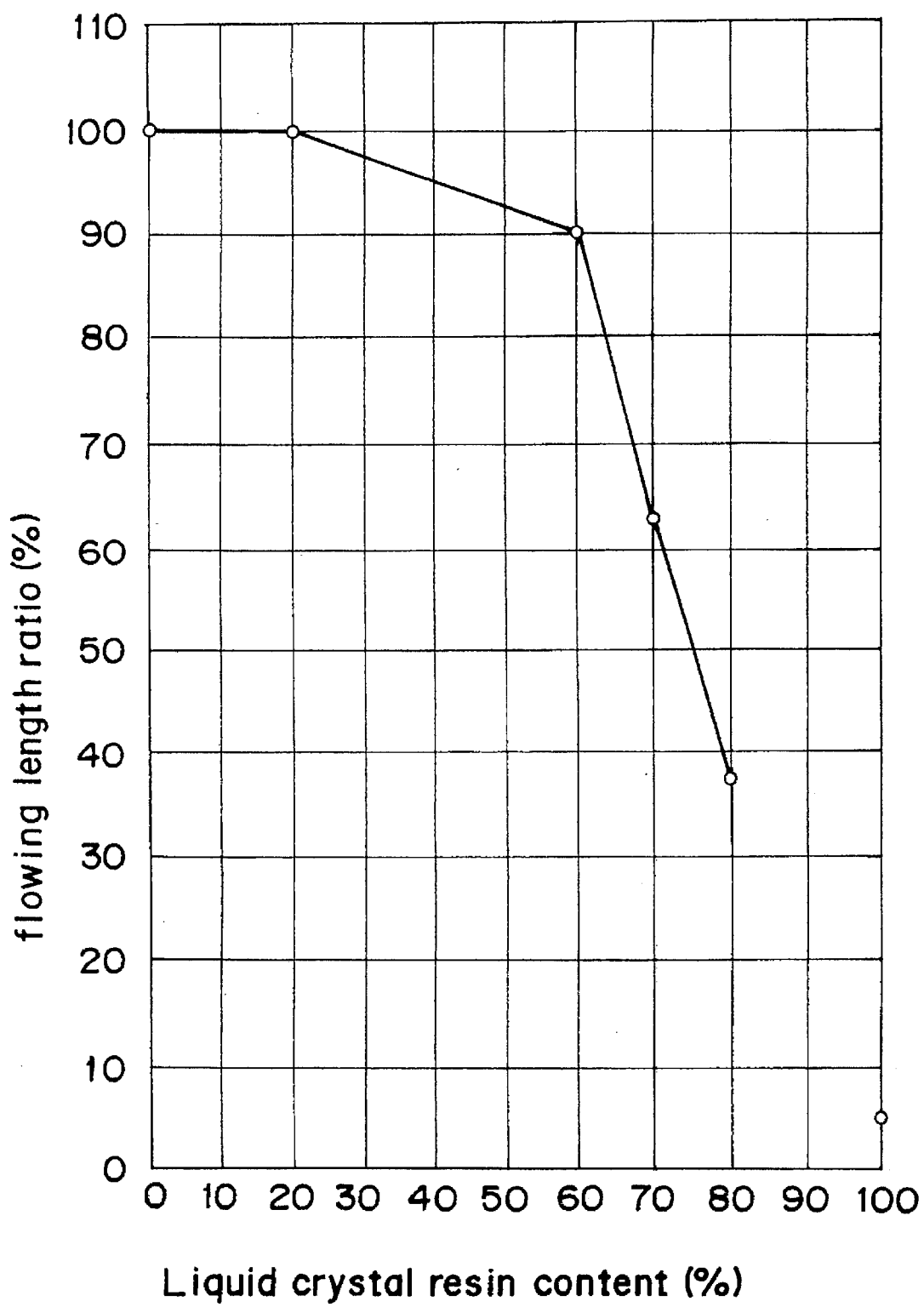
FIG. 9 is a graph showing the relationship between an amount of the liquid crystal polymer and the flowing length ratio of a molding product obtained by using PC/PBT as a thermoplastic resin in the remanufacturing process shown in FIG. 1.

FIG. 9 is a graph showing the relationship between flow length ratio and the content amount of liquid crystal polymer. It is clear from FIG. 9 that flowing ability is greatly decreased at a liquid crystal polymer content higher than 60%. It is difficult to remanufacture a molding product by using the moldable material having a content of liquid crystal polymer higher than 60%. When using PC/PBT as a thermoplastic resin, the content of liquid crystal polymer preferably ranges from 2 to 60%.

An electron microscopic observation (SEM) indicates that the liquid crystal polymer is of a powder form at liquid crystal content of 1%. On the other hand, the liquid crystal polymer content ranging from 2 to 5% results in a liquid crystal polymer of a fiber form. It is understood from the observation that liquid crystal polymer content higher than 2% produces a liquid crystal polymer of fiber form and accordingly, increases the tensile strength of the resultant product.

The following description will be directed to a tensile strength and a flowing ability of a remanufactured molding product obtained by using modified PPO as a thermoplastic resin.

A liquid crystal polymer as a starting material comprises VECTRA A950 (polyesther of aromatic group, the liquid crystal transition temperature is about 280° C.) made by POLYPLASTIC CO. LTD. and a thermoplastic resin PPO as a starting material comprises NORYL PX2623 made by NIPPON GE PLASTIC Co. A composite resin is prepared by mixing the two reagents mentioned above in a given mixing ratio.

Next, the composite resin is subjected to a first extrusion formation under the same conditions as that of the PC/ABS and is formed into a first molding material of a strand form. The first molding material is cut into pellets of a length 3 mm into a first pellets.

The first pellets are injection formed formation in a way similar to that of PC/ABS case to obtain a composite resin. A part of the composite resin is formed into a recycle used moldable material of a strand form as a testing piece in a way similar to that of PC/ABS case.

Next, a tensile strength test is carried out with the original molding material and the recycle used molding material in a way similar to that of PC/ABS case.

Figure 10:
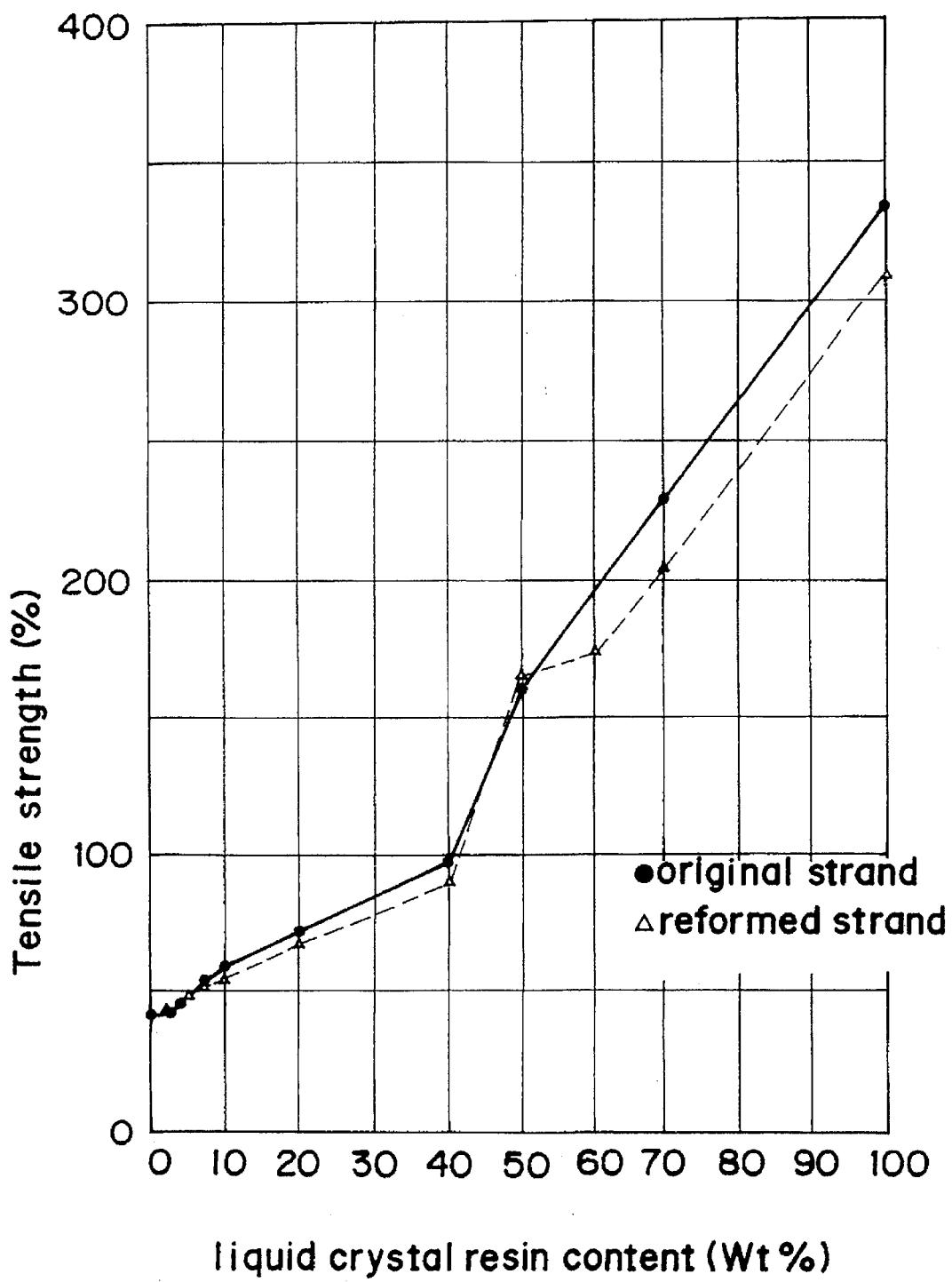
FIG. 10 is a graph showing the relationship between an amount of the liquid crystal polymer and the tensile strength of a molding product obtained by using modified PPO as a thermoplastic resin in the reforming process shown in FIG. 1.
Figure 11:
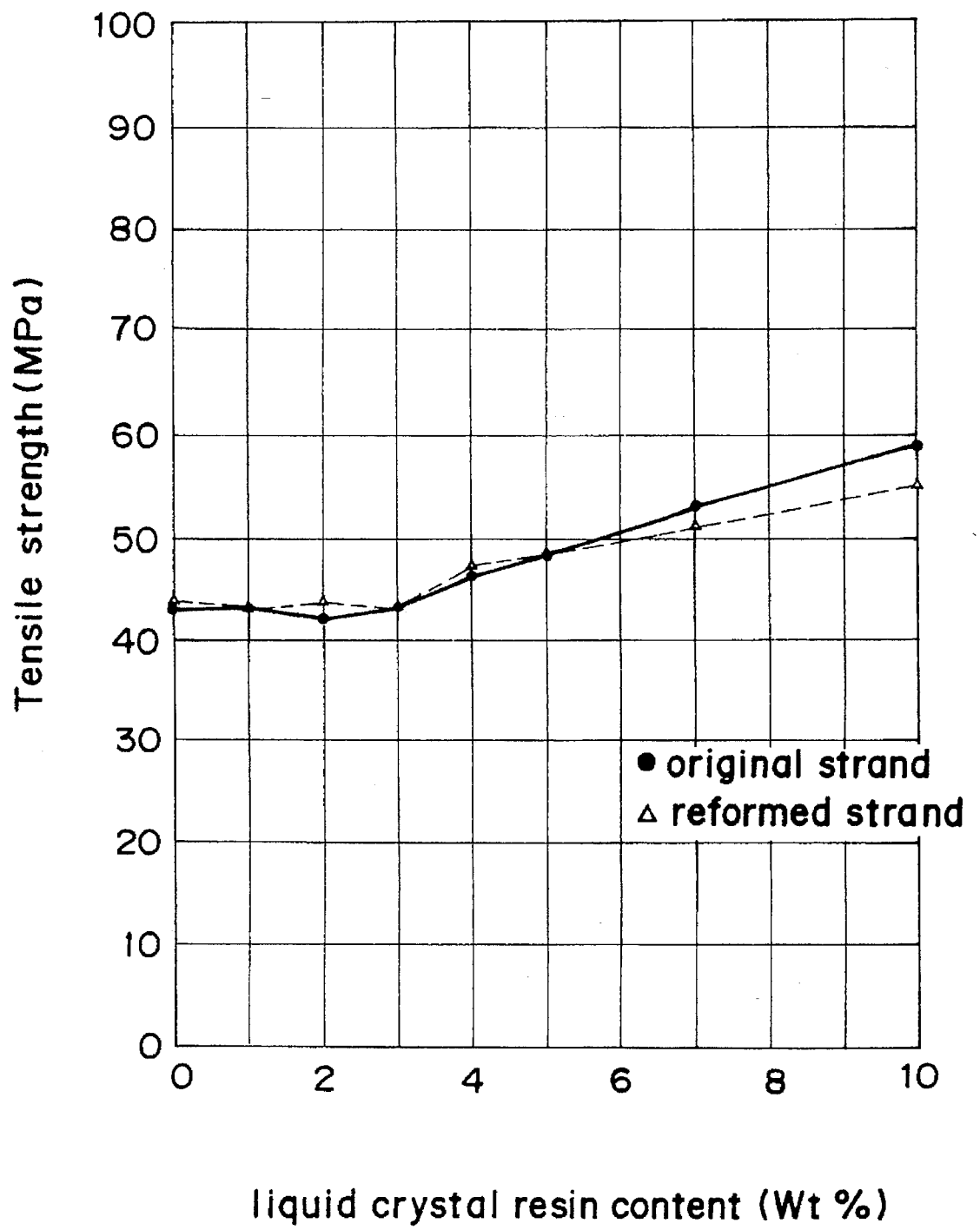
FIG. 11 is a graph showing the relationship between an amount of the liquid crystal polymer and the tensile strength of a molding product obtained by using modified PPO as a thermoplastic resin in the remanufacturing process shown in FIG. 1.

FIGS. 10 and 11 are graphs showing the relation between a tensile strength and a content of the liquid crystal polymer contained in the first molding material and recycle used molding material, respectively. The liquid crystal polymer starts to be formed into a fiber form at a range higher than 3% of the liquid crystal amount. It is found that the original moldable material and recycled moldable material show the same tensile strength at all ranges of liquid crystal polymer content. In connection with a case using modified PPO as a thermoplastic resin, the content of liquid crystal polymer is preferably higher than 3%.

An electron microscopic observation (SEM) indicates that the liquid crystal polymer is in a powder form at a liquid crystal content of 2%. On the other hand, the liquid crystal polymer content ranging from 3 to 5% results in a liquid crystal polymer of a fiber form. It is understood from the observation that the liquid crystal polymer content higher than 3 makes the liquid crystal polymer to be of a fiber form and accordingly, increases the tensile strength of the resultant product.

As explained above, according to the method for reforming a composite resin of the present invention, which comprises of: crushing a molding product of a composite resin of thermoplastic resin and liquid crystal polymer having a crystal transition temperature of the liquid crystal resin higher than a minimum moldable temperature of the thermoplastic resin to obtain crushed particles or pieces; heating said particles or pieces at a temperature higher than the phase transition temperature of said liquid crystal polymer to obtain molten composite resin of thermoplastic resin and the liquid crystal polymer; extruding said molten composite resin at a temperature higher than the phase transition temperature of the liquid crystal polymer to obtain raw moldable material, the liquid crystal polymer cut into a small size by crushing is caused to be combined with each other by the melting process and the combined particles or pieces of liquid crystal polymer come to be of an orientation structure and are solidified as it is. Accordingly, the raw moldable material so obtained has a tensile strength and a rigidity the same as those of the original composite resin. Further, the raw moldable material so obtained is formed into a molding product at a temperature lower than the phase transition temperature of the liquid crystal polymer. Hence, the molding product has the liquid crystal polymer keeping an orientation structure and has a tensile strength and a rigidity the same as those of the original composite resin.

Second, according to the invention which comprising steps of: crushing a molding product of a composite resin of thermoplastic resin and liquid crystal polymer having a crystal transition point of the liquid crystal resin higher than a minimum moldable temperatere of the thermoplastic resin to obtain crushed particles or pieces; heating said particles or pieces at a temperature higher than the phase transition temperature of said liquid crystal polymer to obtain a molten composite resin of thermoplastic resin and the liquid crystal polymer; and extruding said molten composite resin at a temperature higher than the phase transition temperature of the liquid crystal polymer to obtain a molding product in a given shape, the liquid crystal polymer cut into a small size by crushing is caused to be combined with each other by the melting process and the combined crushed particles or pieces of liquid crystal polymer come to be of an orientation structure and are solidified as it is. Accordingly, the molding product so obtained has a tensile strength and a rigidity the same as those of the original composite resin.

Third, according to the present invention, the crushed particles or pieces of liquid crystal polymer are combined to each other during a formation process at a temperature higher than the phase transition temperature of the liquid crystal polymer, so that the liquid crystal polymer can keep a fiber structure having a length the same as that of the liquid crystal polymer contained in the original composite resin. The resultant raw moldable material or the resultant molding product has a tensile strength and rigidity the same as those of the original composite resin.

Fourth, according to the present invention, a raw moldable materials is obtained by extruding the molten composite resin at a temperature higher than the phase transition temperature of the liquid crystal polymer while being drawn. Accordingly, the liquid crystal polymer in the raw moldable material is of an orientation structure aligned to the extrusion direction. This results in an improvement in the tensile strength and rigidity of the raw moldable material and the resultant molding product.

Fifth, according to the present invention, a moldable product is obtained by extruding the molten composite resin at a temperature higher than the phase transition temperature of the liquid crystal polymer under being extended. Accordingly, this results in an improvement in the tensile strength and rigidity of the resultant molding product.

Sixth, according to the present invention, there is obtained a raw moldable material of a strand form. Accordingly, it is easy to carry out the remanufacturing of the raw molding material of a strand form by an injection method by cutting the raw moldable material.

Seventh, according to the present invention, there is obtained a raw moldable material of a sheet form. Accordingly, it is easy to carry out the remanufacturing of the raw moldable material of a sheet form by a pressing formation or vacuum formation method.

What is claimed is:

1. A method for remanufacturing a composite resin of liquid crystal polymer and thermoplastic resin, comprising the steps of:

providing a used molding product of a composite resin of thermoplastic resin and liquid crystal polymer having a crystal transition temperature higher than a minimum moldable temperature of the thermoplastic resin;

crushing said used molding product into particles or pieces;

heating said particles or pieces at a temperature higher than a phase transition temperature of said liquid crystal polymer to obtain a molten composite resin;

extruding said molten composite resin at a temperature higher than the phase transition temperature of the liquid crystal polymer to obtain a new moldable composite material; and forming the new moldable composite material into a molding product in a given shape at a temperature lower than the phase transition temperature of the liquid crystal polymer.

2. A method for remanufacturing a used composite resin of liquid crystal polymer and thermoplastic resin, comprising the steps of:

providing a used molding product of a composite resin of thermoplastic resin and liquid crystal polymer having a crystal transition temperature higher than a minimum moldable temperature of the thermoplastic resin;

crushing said used used molding product into particles or pieces;

heating said particles or pieces at a temperature higher than a phase transition temperature of said liquid crystal polymer to obtain a molten composite resin;

extruding said molten composite resin at a temperature higher than the phase transition temperature of the liquid crystal polymer to obtain a new moldable composite material; and forming said new moldable composite material into a molding product in a given shape at a temperature higher than the phase transition temperature of the liquid crystal polymer.

3. The method for remanufacturing a composite resin according to claim 1 or claim 2, wherein said liquid crystal polymer contained in the composite resin within said used molding product is of a fiber form present in the thermoplastic resin.

4. The method for remanufacturing a composite resin according to claim 1, wherein the step of obtaining a moldable composite material by extruding the molten composite resin at a temperature higher then the phase transition temperature of the liquid crystal polymer is carried out while the moldable composite is being drawn.

5. The method for remanufacturing a composite resin according to claim 2, wherein the step of forming the moldable composite material into a new molded product at a temperature higher then the phase transition temperature of the liquid crystal polymer comprises a step of extrusion-forming the molten composite material into a new molded product of a given shape at a temperature higher than the transition temperature of the liquid crystal polymer carried out while the moldable composite material is being drawn.

6. The method for remanufacturing a composite resin according to claim 1 or 2, wherein in the step of heating the crushed particles or pieces into a molten composite resin, the crushed particles or pieces comprises a mixture of used composite resins having different contents of the liquid crystal resin or a mixture of a used composite resin and a liquid crystal resin and/or a thermoplastic resin.

7. A method of making a molded product of liquid crystal polymer and thermoplastic resin and then remanufacturing the molded product after use of the molded product, comprising the steps of:

mixing the thermoplastic resin and the liquid crystal polymer having a crystal transition temperature higher than a minimum moldable temperature of the thermoplastic resin to obtain a mixed material;

heating the mixed material at a temperature higher than a phase transition temperature of the liquid crystal polymer to obtain a moldable material;

forming the moldable material into a molded product in a given shape at a temperature lower than a phase transition temperature of the liquid crystal polymer;

using the molded product;

crushing the used molded product into particles or pieces;

extruding said crushed product at a temperature higher than the phase transition temperature of the liquid crystal polymer to obtain a moldable used material; and forming the moldable used material into another new molded product in a given shape at a temperature lower than the phase transition temperature of the liquid crystal polymer.

8. A method of making a molded product of liquid crystal polymer and thermoplastic resin and then remanufacturing the molded product after use of the molded product, comprising the steps of:

mixing the thermoplastic resin and the liquid crystal polymer having a crystal transition temperature higher than a minimum moldable temperature of the thermoplastic resin to obtain a mixed material;

heating the mixed material at a temperature higher than a phase transition temperature of the liquid crystal polymer to obtain a molten composite resin;

extruding said molten composite resin at a temperature higher than a phase transition temperature of the liquid crystal polymer to obtain a moldable material;

forming the moldable material into a molded product in a given shape at a temperature lower than the phase transition temperature of the liquid crystal polymer;

using the molded product;

crushing the used molded product into particles or pieces;

heating said particles or said pieces at a temperature higher than the phase transition temperature of the liquid crystal polymer to obtain a molten used composite resin;

extruding said molten used composite resin at a temperature higher than the phase transition temperature of the liquid crystal polymer to obtain a new moldable material; and forming the new moldable material into another new molded product in a given shape at a temperature higher than the phase transition temperature of the liquid crystal polymer.

9. A method of making a molded product of liquid crystal polymer and thermoplastic resin and then remanufacturing the molded product after use of the molded product, comprising the steps of:

mixing the thermoplastic resin and the liquid crystal polymer having a crystal transition temperature higher than a minimum moldable temperature of the thermoplastic resin to obtain a mixed material;

heating the mixed material at a temperature higher than a phase transition temperature of the liquid crystal polymer to obtain a molten composite resin;

extruding said molten composite resin at a temperature higher than a phase transition temperature of the liquid crystal polymer to obtain a moldable material;

forming the moldable material into a molded product in a given shape at a temperature higher than the phase transition temperature of the liquid crystal polymer;

using the molded product;

crushing the used molded product into particles or pieces;

heating said particles or said pieces at a temperature higher than the phase transition temperature of the liquid crystal polymer to obtain a molten used composite resin;

extruding said molten used composite resin at a temperature higher than the phase transition temperature of the liquid crystal polymer to obtain a used moldable material;

forming the used moldable material into another new molded product in a given shape at a temperature lower than the phase transition temperature of the liquid crystal polymer.

10. A method of making a molded product of liquid crystal polymer and thermoplastic resin and then remanufacturing the molded product after use of the molded product, comprising the steps of:

mixing the thermoplastic resin and the liquid crystal polymer having a crystal transition temperature higher than a minimum moldable temperature of the thermoplastic resin;

heating the mixed material at a temperature higher than a phase transition temperature of the liquid crystal polymer to obtain a molten composite resin;

extruding said molten composite resin at a temperature higher than the phase transition temperature of the liquid crystal polymer to obtain a moldable material;

forming the moldable material into a molded product in a given shape at a temperature higher than the phase transition temperature of the liquid crystal polymer;

using the molded product;

crushing the used molded product into particles or pieces;

heating said particles or said pieces at a temperature higher than the phase transition temperature of the liquid crystal polymer to obtain a molten used composite resin;

extruding said molten used composite resin at a temperature higher than the phase transition temperature of the liquid crystal polymer to obtain a used moldable material;

forming the used moldable material into a new molded product in a given shape at a temperature lower than the phase transition temperature of the liquid crystal polymer.

11. The method for remanufacturing a composite resin according to claim 1 or 4, wherein the moldable composite material is in a strand form.

12. The method for remanufacturing a composite resin according to claim 1 or 4, wherein the moldable composite material is in a sheet form. phase transition temperature of the liquid crystal polymer.

* * * * *